United States Patent [19]

Inoue

[11] Patent Number: 4,578,556

[45] Date of Patent: Mar. 25, 1986

[54] EDM METHOD AND APPARATUS UTILIZING WATER VAPOR

[75] Inventor: Kiyoshi Inoue, Tokyo, Japan

[73] Assignee: Inoue-Japax Research Incorporated, Yokohamashi, Japan

[21] Appl. No.: 636,062

[22] Filed: Jul. 30, 1984

Related U.S. Application Data

[63] Continuation of Ser. No. 405,076, Aug. 4, 1982.

[51] Int. Cl.$^4$ ............................. B23P 1/08; B23P 1/16
[52] U.S. Cl. ............................... 219/69 M; 219/69 D; 219/69 W
[58] Field of Search ............... 219/69 D, 69 R, 69 M, 219/68; 214/129.5, 129.7

[56] References Cited

U.S. PATENT DOCUMENTS 4,205,212  5/1980  Ullmann et al. ................. 219/69 W

FOREIGN PATENT DOCUMENTS

| 637872 | 5/1950 | United Kingdom . |
| 787731 | 12/1957 | United Kingdom . |
| 941058 | 11/1963 | United Kingdom . |
| 1076171 | 7/1967 | United Kingdom . |
| 1136956 | 12/1968 | United Kingdom . |
| 1369496 | 10/1974 | United Kingdom . |
| 2077171 | 12/1981 | United Kingdom . |
| 0621525 | 8/1978 | U.S.S.R. ............................. 219/69 D |

Primary Examiner—M. H. Paschall
Attorney, Agent, or Firm—Karl F. Ross; Herbert Dubno

[57] ABSTRACT

A method of and an apparatus for the electroerosive machine of a workpiece in which a tool electrode, such as a traveling wire, traverses a nozzle which coaxially directs into the machining gap a mixture of water vapor and liquid water. The liquid water is drawn into the nozzle by the suction created by the passage of steam therethrough and the proportions of liquid water and water vapor in the machining fluid are controlled in response to gap conditions. The water vapor or steam is generated by heating a body of water in the apparatus.

2 Claims, 2 Drawing Figures

EDM METHOD AND APPARATUS UTILIZING WATER VAPOR

This is a continuation of prior application Ser. No. 405,076, filed Aug. 4, 1982.

FIELD OF THE INVENTION

The present invention relates to electroerosion machining and, more particularly, to a new and improved method of and apparatus for electroerosively machining a conductive workpiece with a tool electrode by utilizing a water fluid medium.

BACKGROUND OF THE INVENTION

In electroerosion machining processes, it is well recognized that the machining medium plays important roles. These roles include the function as an electrical-discharge medium, the flushing of machining products and the cooling action. While the electroerosive machining medium has commonly made use of a hydrocarbon such as kerosene conventionally to fulfill these requirements, such a liquid is disadvantageously inflammable, involving the danger of a fire. Now, as an alternative thereto, water is widely in use, especially with a traveling-wire EDM machine. While a water liquid when distilled provides fairly well the required functions as the electroerosive machining medium, it leaves much to be desired as to its abilities to gain stock removal, machining stability and precision when comparison is made with a conventional inflammable hydrocarbon liquid.

OBJECTS OF THE INVENTION

The present invention seeks to provide a novel and improved electroerosion machining method which assures enhancement in machining efficiency and performance over the conventional processes utilizing a water liquid.

The present invention also seeks to provide a novel and improved electroerosion apparatus for carrying out the method described.

SUMMARY OF THE INVENTION

In accordance with the present invention there is provided, in a first aspect thereof, a method of electroerosively machining a workpiece, which method comprises: (a) spacedly juxtaposing a tool electrode with the workpiece to define a machining gap therewith; (b) supplying into said machining gap a machining fluid constituted at least in part by a water vapor; (c) passing a succession of electrical pulses across the gap between the tool electrode and the workpiece to electroerosively remove stock from the workpiece; and (d) relatively displacing the tool electrode and the workpiece to advance the electroerosive stock removal of the workpiece.

The machining fluid may contain, in addition to water in its vapor phase, water in its liquid phase and should have a specific resistance ranging between 10 and $10^5$ ohm-cm and preferably between $10^2$ and $10^4$ ohm-cm. The specific resistance of the water vapor/liquid mixture machining fluid is controlled by controlling the proportion of the water vapor and the water liquid therein. The water liquid may be an aqueous solution of an electrolyte.

The machining fluid may be a mixture of water vapor, a gas such as air and a water liquid and should again have a specific resistance ranging between 10 and $10^5$ ohm-cm and preferably between $10^2$ and $10^4$ ohm-cm. Here again, the water liquid may be an aqueous solution of an electrolyte. The specific resistance of the mixed machining fluid is here again controlled as desired by controlling the proportion of the water vapor, the gas and the water liquid.

The unique machining fluid may, according to a specific feature of the invention, be supplied into the machining gap by: connecting a nozzle via a fluid conduit with a fluid-tight vessel partially filled with a predetermined amount of a water liquid, orienting the nozzle towards the machining gap, heating the water liquid in the vessel to produce a pressure vapor constituting the said water vapor above the surface the water liquid in the vessel and permitting the pressure vapor to be fed in a high-velocity stream through the conduit and to be injected from the nozzle into the machining gap.

The present invention also provides, in a second aspect thereof, an apparatus for electroerosively machining a workpiece with a tool electrode spacedly juxtaposed therewith across a machining gap, which apparatus comprises: (a) means for supplying into the machining gap a machining fluid constituted at least in part by a water vapor; (b) power supply means for passing a succession of electrical pulses across the gap between the tool electrode and the workpiece to electroerosively remove stock from the workpiece; and (c) means for relatively displacing the tool electrode and the workpiece to advance the electroerosive stock removal of the workpiece.

Specifically, means (a) comprises at least one nozzle means adapted to be oriented towards the machining gap and communicating via conduit means with a fluid, tight vessel partially filled with a water liquid and means for heating the water liquid in the vessel whereby the pressure vapor constituting at least a portion of the machining fluid is forced to flow through the conduit means and thence is injected from the nozzle means into the machining gap.

The conduit means may include a mixing means having a first inlet communicating with the vessel for supplying the water vapor from the vessel to the mixing means whereby the water vapor and the water liquid are mixed together in the mixing means and the mixture constituting at least a portion of the machining liquid is forced through the nozzle means for injection into the machining gap.

The conduit means may also include a further mixing means having a first inlet communicating with the vessel for supplying the water vapor from the vessel to the second mixing means and a further second inlet for supplying a gas to the second mixing means whereby the water vapor and the gas are mixed together in the second mixing means and the mixture constituting at least a portion of the machining liquid is forced through the nozzle means for injection into the machining gap.

BRIEF DESCRIPTION OF THE DRAWING

These and other features of the present invention as well as advantages thereof will become more readily apparent from a reading of the following description when taken with reference to the accompanying drawing in which.

SPECIFIC DESCRIPTION

Referring to FIGURES, an embodiment of the invention will be described by reference to the traveling-wire EDM (electrical discharge machining) process in which the invention is advantageously employed. Nevertheless it should be apparent that the invention is applicable to non-wire or cavity-forming EDM processes for drilling, die-sinking or like purposes as well.

Figure 1:
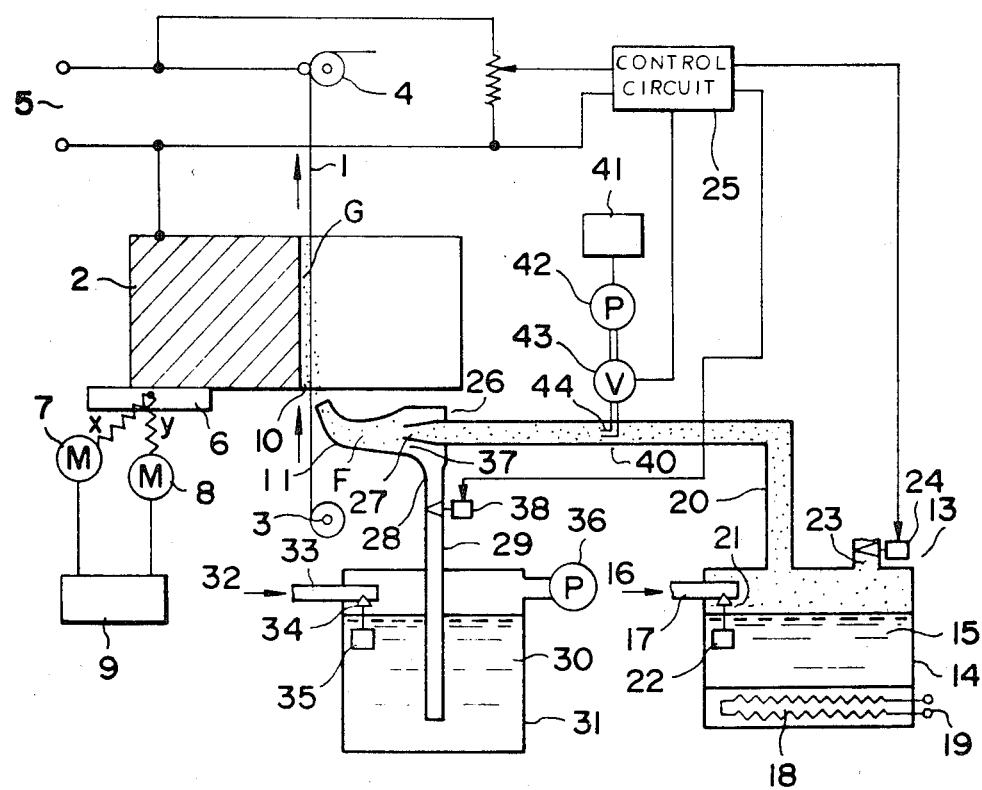
FIG. 1 is a sectional view diagrammatically illustrating an embodiment of the invention as applied to a traveling-wire EDM arrangement.

In FIG. 1, a wire electrode 1 is shown juxtaposed with a workpiece 2 in electroerosion machining relationship therewith. The wire electrode 1 is fed from a storage reel (not shown), axially transported between a pair of wire guide members 3 and 4 and fed into takeup means (not shown). The guide members 3 and 4 are positioned to define a vertical straight line path therebetween for the wire electrode 1 to axially travel, as shown, from down to up in the direction indicated by the arrow indicated. The wire electrode 1 is axially driven by a traction drive unit (not shown) provided between the upper guide member 4 and the wire takeup and the desired tension on the traveling wire 1 and its rate of travel are established by this drive unit in conjunction with a braking unit (not shown) provided between the storage reel and the lower guide member 3. A machining gap G is formed between the traveling wire electrode 1 and the workpiece 2 and supplied with a unique machining fluid to be described.

An EDM power supply 5 is connected to the wire electrode 1 and the workpiece 2 to apply a succession of electrical pulses therebetween which result in electroerosive machining discharges across the gap G to remove material from the workpiece 2.

The workpiece 2 is securely mounted on a worktable 6 which in a cross-slide arrangement is horizontlly driven by a pair of motors 7 and 8 in response to drive signals supplied from a machining feed control unit 9, e.g. a numerical-control (NC) unit. The motor 7 is designed to displace the worktable 6 in an X-axis and the motor 8 is designed to displace the worktable 6 in a Y-axis orthogonal to the X-axis. Data for a prescribed cutting pattern are stored in the control unit 9 and converted into drive signals to displace the workpiece 2 transversely and relative to the wire electrode 1 traveling along the aforesaid straight line path between the guide members 3 and 4, along a displacement path in the X-Y plane corresponding to the prescribed cutting pattern. During the cutting operation, a groove 10 is formed behind the wire electrode progressively as the workpiece 2 is displaced.

Shown disposed below and adjacent to the workpiece 2 is a nozzle 11 oriented towards the machining gap G for delivering the machining fluid F thereto. Preferably, such a nozzle is also disposed above and adjacent to the upper surface of the workpiece 2 so as to be oriented towards the machining gap G. In accordance with the present invention, the machining fluid F is constituted at least in part by a water vapor produced at a water vaporization unit 13 comprising a tightly sealed vessel 14 containing a water liquid 15 introduced therein from a water supply 16 through an inlet pipe 17. The water liquid 15 may be distilled water having a specific resistance between 10 and $10^5$ ohm-cm obtained by passing a municipal or tap water through an ion-exchange cartridge. The vessel 14 is equipped on its floor portion with a heater 18 energized by a power supply 19 to vaporize the water liquid 15 therein. The water vapor is collected above the surface of the water liquid 15 in the vessel 14 and fed into the nozzle 11 via an outlet conduit 20. The water vapor is fed via the nozzle 11 into the machining gap G.

The water inlet pipe 17 is provided with a valve 21 connected to a float 22 in the vessel 14 so that the valve 21 is closed to stop water supply from the source 16 when the float 22 rises in the water liquid 15 to a given level. In this manner, the quantity of the water liquid 15 unvaporized in the vessel 14 is maintained constant. The vessel 14 is also provided with a relief outlet 23 open to the atmosphere and whose opening is controlled by an electromagnetic valve 24 to control the vapor pressure in the vessel 14 and hence the vapor flow into the nozzle 11. The valve 24 is designed to be electromagnetically controlled by a control circuit 25 whose input is electrically connected to the machining gap G to sense a gap variable such as gap voltage, current, resistance, and/or impedance. The valve 24 is thus automatically controlled by the control circuit 25 in response to the gap signal so that the volume flow of the water vapor into the nozzle 11 is varied optimally in accordance with the gap state. For example, a reduction in the gap impedance brings about an increase in the volume flow of the water vapor into the machining gap G and vice versa.

In accordance with a further feature of the invention, the water vapor is supplied in mixture with a water liquid into the machining gap G. Accordingly, the apparatus shown includes a mixing chamber 26 formed in the nozzle unit 11. The mixing chamber 26 has a first inlet 27 constituted by a converging end portion of the conduit 20 received in the nozzle 11 for injecting the stream of the water vapor into the nozzle 11. The mixing chamber 26 has a second inlet 28 which communicates via a conduit 29 with a water liquid 30 received in a tightly sealed vessel 31. The water liquid 30 is supplied into the vessel 31 from a supply 32 via an inlet conduit 33 and may here again be distilled water obtained by passing a municipal or tap water through an ion-exchange resin cartridge. The water liquid 30 may have a specific resistance ranging between $10^3$ and $10^5$ ohm-cm. The water supply 31 may be the same as the water supply 16. The inlet conduit 33 is provided with a valve 34 mechanically connected to a float 35 so that the valve 34 is closed to stop the water supply from the source 32 when the float 35 rises to a given level. In this manner, the quantity of the water liquid 30 in the vessel 31 is maintained constant.

A compressor 36 is also connected to the vessel 31 to pressurize the water liquid 30 therein. The air compressed in the space above the water surface in the vessel 31 causes the water liquid in the conduit 29 to rise and to be fed into the mixing chamber 26 in the nozzle 11. The inlet 11 to the mixing chamber 26 as mentioned communicates with the water vapor source via the conduit 20 and constitutes an injection nozzle for injecting the water vapor into the nozzle 11. A region of negative pressure 37 communicating with the second inlet 28 and the conduit 29 is created around the nozzle 27. As a result, the water liquid rising in the conduit 29 and through the inlet 28 is sucked into the region 37 and effectively mixed with and caught in the water vapor flowing from the conduit 20 into the nozzle 11. A homogeneously mixed flow of the water vapor and the water liquid, which constitutes the machining fluid F, is thus produced in the nozzle 11 and delivered into the region of the machining gap G. The machining fluid F should have a specific resistance ranging between 10 and $10^5$ ohm-cm and preferably between $10^2$ and $10^4$ ohm-cm.

The conduit 29 is provided with a valve 38 which is designed to be elctromagnetically controlled by the control circuit 25 mentioned earlier. The valve 38 is thus automatically controlled by the control circuit 25 in response to the gap signal so that the proportion of the water liquid mixed with the water vapor is varied optionally in accordance with the gap state. It will be noted that the valve 38 and the valve 24 should be also adjustable manually to establish such an optimum proportion which may be fixed (in case they are designed to be insensitive to the control circuit) corresponding to an optimum gap state determined by a preset machining condition.

The valve 38 may be completely closed to allow only the water vapor from the vaporization unit 13 to be supplied in a stream into the machining gap G.

The valve 24 should be adjusted to establish an optimum volume flow of the water vapor to be supplied, in or without admixture with the water liquid, into the machining gap G in accordance with a preset machining condition and may be controlled by the circuit 25 to vary the proportion in the mixed machining fluid F or the quantity, of the water vapor supplied into the machining gap optimally in accordance with the varying gap state.

The valve 38 should be adjustable to establish an optimum quantity and proportion of the water liquid in the mixed machining fluid F in accordance with a preset machining condition and may be controlled by the circuit 25 to vary the proportion and quantity optimally in accordance with the varying gap state.

The proportion of the water vapor and the water liquid in the mixture determines the specific resistance of the machining fluid F supplied into the machining gap.

In a typical operation of the apparatus, the valve 38 may normally be closed. The valve 24 should then be adjusted to allow the water vapor alone to be supplied at a given volume flow rate into the machining gap G. The control circuit 25 monitors the gap state and, in response to a gap signal indicating a characteristic gap state such as the development of a gap short-circuiting or arcing which requires a greater proportion of water content for its suppression, acts on the valve 36 to allow the water vapor to be mixed with the water liquid for delivery into the gap G until the suppression is attained or for a given time period in which the suppression would be achieved.

When the water fluid which has hitherto been used exclusively in its liquid phase in the conventional EDM processes is used in its vapor phase, it has been found that its requisite functions as an electrical-discharge and flushing medium are effectively retained and its additional function as a cooling medium is largely enhanced. The results are quicker cooling of each individual discharge spot and a consequential greater constriction of each individual discharge column, both contributing to an enhancement of EDM stock removal. Furthermore, the enhanced cooling effect overcomes the problem of accidental wire breakage, hence permitting the use of a thinner wire electrode which assures an increased cutting accuracy and permitting wire travel under an increased tension which assures greater cutting stability. Accordingly, cutting efficiency, precision and stability are improved.

EXAMPLE

A workpiece composed of $SKD_{11}$ (Japanese Industrial Standard) material and of a thickness of 20 mm was machined by electroerosion with a wire electrode composed of copper and having a diameter of 0.2 mm. The wire electrode was continuously driven to axially travel at a speed of 2 m/min through the workpiece while a succession of electroerosion machining pulses having a pulse duration $\tau$ on of 4 microseconds, a pulse interval $\tau$ off of 10 microseconds and a peak current Ip of 20 amperes were passed between the wire electrode and the workpiece through the machining fluid. When the machining fluid was constituted by water vapor which was produced in a vaporization unit and supplied into the machining gap at a volume flow rate of 1.5 liter/min in a nozzle assembly generally shown and described hereinbefore, the workpiece was machined at a removal rate as low as 1.6 mm/min. When the machining fluid was constituted by a mixture containing in volume 3 parts of water vapor and 1 part of water liquid of a specific resistance of $2 \times 10^3$ ohm-cm and supplied at a volume flow rate of 1 liter/minute, the workpiece was machined at a removal rate of 1.9 mm/min. No breakage of the wire electrode took place in each of the above two case. When the machining fluid was constituted by the water liquid alone in accordance with the conventional EDM practice, the workpiece was machined at a removal rate of 1 mm/min.

In FIG. 1, the conduit is also shown provided with a further mixing chamber 40 in which the water vapor for the vaporization unit 13 is admixed with a gas such as air. The gas from a source 41 is forced by a pump 42 into the conduit 20 of the mixing chamber 40 via a valve 43 and a nozzle 44. The valve 43 is controlled by the control circuit 25 in response to the gap signal to control the proportion of the gas in the mixture in accordance with the gap state.

Figure 2:
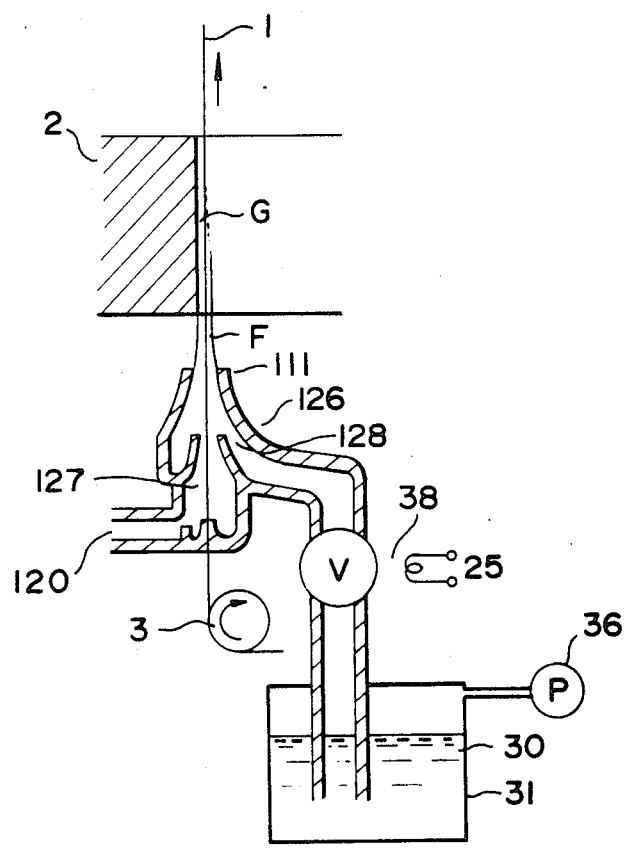
FIG. 2 is a sectional view diagrammatically illustrating a modification of the embodiment of FIG. 1.

In FIG. 2 there is shown a modified nozzle 111 arranged coaxially with a wire electrode 1 traveling vertically upwards from the lower guide member 3 to the upper guide member (not shown) through the workpiece 2. As in the embodiment of FIG. 1, the nozzle 111 comprises a mixing chamber 126 having a first fluid inlet 127 and a second fluid inlet 128 arranged coaxially with the first fluid inlet 127 and with the wire electrode 1 and communicating with a volume of the water liquid 30 retained in the vessel 31. The water liquid 30 may here again be distilled water or an aqueous solution of an electrolyte such as sodium chloride or potassium nitrite. The first fluid inlet may communicate with the vaporization vessel 14 shown in FIG. 1 but may be any other device of conventional design for generating a water vapor. In the mixing chamber 126, a stream of the water vapor fed through the first inlet 127 is mixed with the water liquid drawn through the second inlet 128, the mixture of machining fluid F being injected into the machining gap as described previously. It should be noted that instead of the water vapor alone, a mixture of the water vapor and air or any other gas such as oxygen, carbon dioxide, nitrogen or argon may be injected through the first fluid inlet 127 into the mixing chamber so that the machining fluid F may be composed of a combination of the water vapor, gas and water liquid. In this case, a vapor/gas mixing chamber of conventional design is provided in the conduit 120 leading from the water vaporization unit 13 in FIG. 1.

The machining fluid F should have a specific resistance ranging between 10 and $10^5$ ohm-cm and preferably between $10^2$ and $10^4$ ohm-cm. The proportion of the water vapor, the gas and the aqueous solution or the water liquid in the machining fluid F should be controlled to assure that the specific resistance of the mixed fluid F is confined in such a range and should preferably be also controlled by the control circuit 25 as described hereinbefore.

What is claimed is:

1. A method of machining a conductive workpiece which comprises the steps of:
   (a) spacedly juxtaposing a traveling tool electrode with an electrically conductive workpiece to define a machining gap therebetween;
   (b) passing said tool electrode in succession coaxially through an inner nozzle and an outer nozzle into which said inner nozzle opens before said traveling electrode is juxtaposed with said workpiece to define said gap, said outer nozzle being axially trained on said gap;
   (c) generating water vapor by heating a body of liquid water;
   (d) introducing said water vapor into said inner nozzle whereby said water vapor contacts said electrode before said electrode enters said outer nozzle;
   (e) injecting water vapor from said inner nozzle into said outer nozzle to induce suction in said outer nozzle and entrain liquid water from a source other than said water vapor into said outer nozzle for admixture with said water vapor in said outer nozzle and discharging of the resulting mixture of said water vapor and liquid water into said gap as a machining liquid;
   (f) passing a succession of electrical pulses across said gap between said electrode and said workpiece to electroerosively remove stock from said workpiece; and
   (g) relatively displacing said tool electrode and said workpiece in a direction generally transverse to a direction of travel of said tool electrode to advance the electroerosive stock removal of said workpiece.

2. An apparatus for machining a conductive workpiece which comprises:
   (a) a continuous tool electrode displaced along a linear path through said workpiece and defining a machining gap therewith;
   (b) an outlet nozzle coaxial with said tool electrode and traversed thereby, said nozzle being disposed adjacent to said gap, opening into said gap and defining a compartment surrounding said electrode;
   (c) an inlet nozzle opening into said outlet nozzle, coaxial with said electrode and said outlet nozzle and traversed by said electrode so that said electrode passes first through said inlet nozzle and then through said outlet nozzle before entering said gap;
   (d) a source of water vapor connected to said inlet nozzle whereby said water vapor contacts the electrode before said electrode enters said outer nozzle and said inner nozzle directs water vapor into said compartment to generate suction therein;
   (e) means including a source of liquid water other than said water vapor connected to said outer nozzle whereby said liquid water is drawn by said suction into said outer nozzle and is admitted therein with said water vapor so that a mixture of liquid water and water vapor is directed axially into said gap to form a machining liquid;
   (f) power supply means for passing a succession of electric pulses across said gap between the tool electrode and the workpiece to electroerosively remove stock from the workpiece; and
   (g) means for relatively displacing said tool electrode and said workpiece in a direction transverse to the displacement of said electrode along said path to advance the electroerosive stock removal from said workpiece.

* * * * *